Nov. 19, 1963 W. T. ANDERSON 3,110,952
CARBIDE TIPPED SAW BLADE
Filed May 18, 1961 2 Sheets-Sheet 1
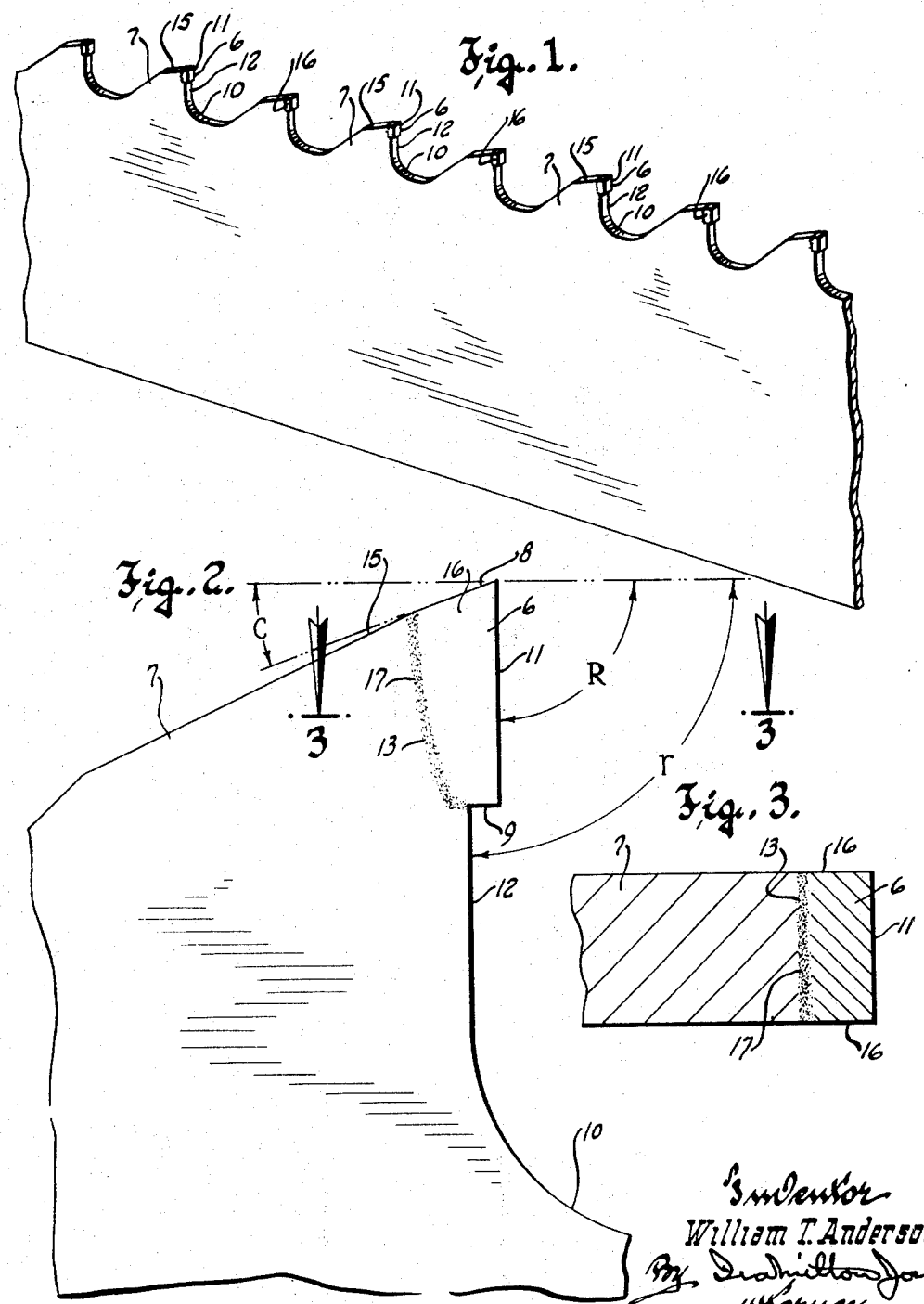

Nov. 19, 1963   W. T. ANDERSON   3,110,952
CARBIDE TIPPED SAW BLADE
Filed May 18, 1961   2 Sheets-Sheet 2
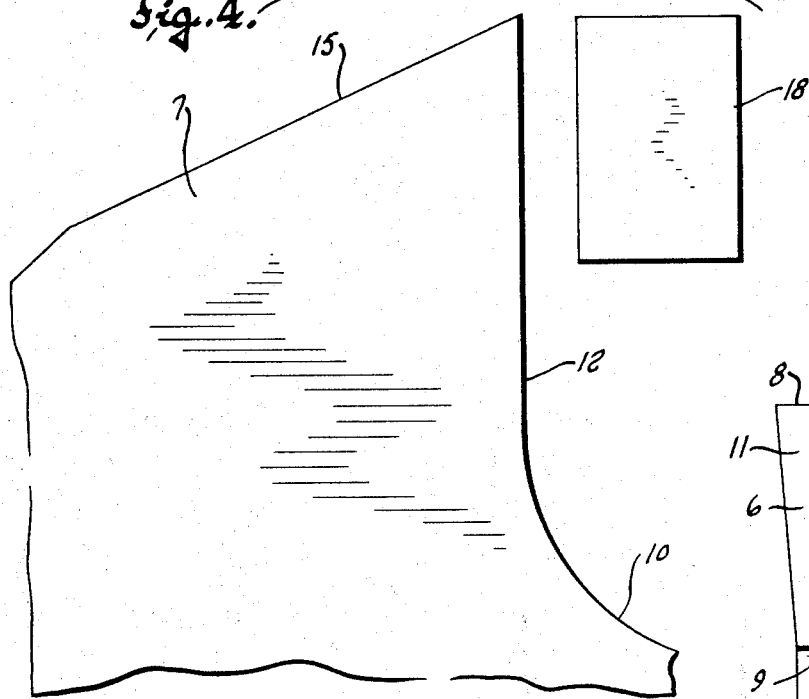
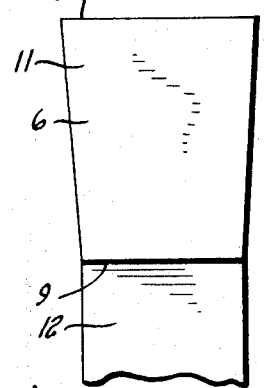
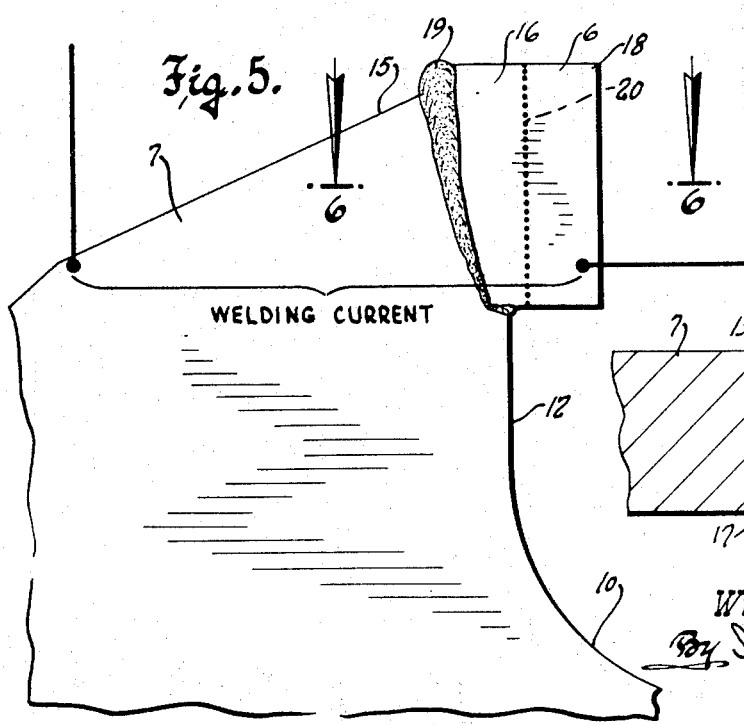
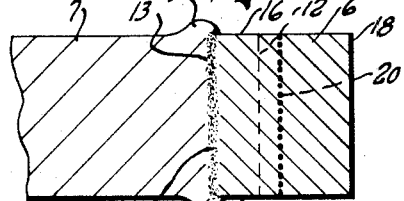
Inventor
William T. Anderson United States Patent Office 3,110,952
Patented Nov. 19, 1963

3,110,952
CARBIDE TIPPED SAW BLADE
William T. Anderson, Vernon Township, Lake County, Ill., assignor to The DoAll Company, Des Plaines, Ill., a corporation of Illinois
Filed May 18, 1961, Ser. No. 110,998
1 Claim. (Cl. 29—95)

This invention relates broadly to saws, and refers more particularly to metal cutting band saws or blades, the making of which poses problems not encountered in the manufacture of other types of saws and metal cutting tools.

The advantages of a saw band or blade having extremely hard cutting edges or points on its teeth and a back or body which is tough and fatigue resistant, have been known and understood for many years. In an effort to achieve this objective, but compromising to the extent that the entire tooth was hard, and hence not able to withstand shock, the art early in its development employed a compound or laminated steel strip consisting of a narrow band of very hard steel welded to one edge of a wide band of softer steel, the teeth obviously being in the hard steel band. The Neihl Patent No. 907,167, and the Blum Patent No. 1,535,096, are examples of this way of making saw blades.

Another approach to the problem was through selective heat treatment and tempering of the saw band or blade, i.e. giving the teeth a heat treatment different from that of the rest of the band. This expedient forms the basis of the Whitaker Patent No. 1,130,649, and the Napier Patent No. 1,352,140.

A third approach to the problem consisted in brazing or similarly fastening hard steel or carbide inserts or tips in or to the teeth. Examples of this type of saw blade or band will be found in the Wilkie Patent No. 2,318,549, and the Kolesh Patent No. 2,880,768.

Obviously, of course, the success of a saw band or blade having hard steel or carbide inserts or tips fastened in or to the teeth, depends upon the security of the fastening and the support given the cutting tips or points by the body of the teeth. The patentee Kolesh recognized this and, in an attempt to meet these requirements, swaged the front or leading faces of the teeth to provide seats of increased area to support the hard metal or carbide tips which were brazed or similarly fastened thereto. But this still left the serious objection of having to braze or similarly secure the hard steel or carbide to the teeth, and—as will be shown—the objection resides not only in the difficulty of handling the small carbide tips, but more seriously, in the very nature of the bond.

Brazing materials customarily used are non-ferrous, brass being the most common. Hence, they have the disadvantage that as a result of the "work hardening" that occurs in use, such materials may become brittle, especially where the area of the bond is small in relation to the effective cutting edge of the tool, as it is in a saw blade. Also, the temperatures reached by the carbide tips during the cutting operation often can exceed the melting point of the brazing material. Obviously, therefore, a saw blade in which the carbide tips are brazed to the teeth, still leaves much to be desired.

The saw band or blade of this invention, like those of the Wilkie and Kolesh patents, has carbide cutting tips or points secured to the saw teeth which are integral with the rest of the band and hence are formed of steel having the properties necessary to withstand shock and have good resistance to fatigue failure, but because of a new and improved way of securing the carbide tips to the steel teeth, a greatly improved saw band or blade is obtained. The cutting tips do not break off, and no need exists for having the teeth widened at their tips, although special shapes with wider cutting edges are readily accommodated.

The purpose and object of this invention, thus is to provide an improved metal cutting saw band or blade characterized by a tough, fatigue resistant back and teeth, coupled with extremely hard cutting points or edges on the teeth.

Although a word description of the invention might be sufficient for those skilled in the art to understand the same, the accompanying drawings will no doubt be of considerable help. In these drawings:

FIGURE 1 is a perspective view of a length of saw band or blade embodying this invention;

FIGURE 2 is a side view of one tooth of the band at a greatly enlarged scale, showing the same in its finished condition;

FIGURE 3 is a cross sectional view through FIGURE 2 on the plane of the line 3—3;

FIGURE 4 is a side view of a tooth and a carbide slug in position to be applied to the tooth preparatory to forming or shaping it into a hard cutting point for the tooth;

FIGURE 5 is a side view of the tooth with the carbide slug secured thereto;

FIGURE 6 is a detail cross sectional view through FIGURE 5 on the plane of the line 6—6; and FIGURE 7 is a front view of a tooth embodying the invention in a slightly modified form, in which the cutting face of the tooth has divergent sides.

As best shown in FIGURES 2 and 3, the saw teeth of this invention have certain distinguishing characteristics, even apart from the specific junction between the teeth and their carbide cutting tips or points. The carbide tip 6 is quite small in comparison to the tooth 7. Its total length from its outer end 8 to its inner end 9 seldom if ever exceeds one-third the total height of the tooth, and generally is less. The tooth height, of course, is the distance from the bottom of its gullet 10 to its outer extremity.

The front face 11 of the carbide tip is flat and it may be parallel to the front or leading edge 12 of the tooth, as shown, though this is not essential. For instance, the rake angle of both the front edge of the tooth and the front face 11 of the carbide tip may be 0°, which of course is 90° to the direction of band travel, as shown by the angles "r" and "R" in FIGURE 2. Or, if desired, the rake angle of the front face 11 of the carbide tip could be something between 0° and 10°, either positive or negative, regardless what the rake angle of the tooth edge 12 might be. For sharpening purposes, however, it is preferable to have the front face of the carbide tip protrude beyond the front edge of the tooth. The thickness of the carbide tip, as measured from its front face 11 back to its rear 13, is greater at its outer end than at its inner end, but even at its inner end, it is set into the tooth so that the tip is solidly supported.

Still another distinguishing characteristic of this invention is that both sides 16 of the carbide tip are flush with the sides of the tooth and that the top clearance angle (C in FIGURE 2) of the carbide tip is slightly less than that of the adjacent portion of the trailing edge 15 of the tooth. This latter feature facilitates grinding of the top or outer end of the carbide tip for sharpening purposes, since it enables the tip to be ground without having the diamond grinding wheel come in contact with the steel of the tooth.

The primary distinguishing characteristic of the saw tooth of this invention, however, lies in the junction between the carbide tip and the tooth. This junction which the drawing depicts by the stippled zone 17, extends across the portion of the inner end 9 of the carbide tip which is set into the tooth, and along the rear 13 of the tip. It consists exclusively of the carbide of which the tip is formed and the steel of the tooth, and is formed by fusing the carbide tip to the steel.

Although the fusion of the carbide tips to the teeth might be effected in other ways, it can be accomplished by providing a slug 18 of tungsten carbide (if the tip is to be formed of tungsten carbide) which, as shown in FIGURE 4, is larger than the finished carbide tip on the tooth, being higher and thicker than the finished tip and at least as wide as the tooth; grasping this slug 18 in a suitable holder or fixture (not shown) and gripping the tooth 7 in another suitable holder or fixture, and then by means of these holders or fixtures, bringing the slug 18 into physical contact with the front edge 12 of the tooth, while at the same time an electric welding current is passed across the junction therebetween as depicted in FIGURE 5.

As a result of the current flow, the outer front portion of the tooth which is contiguous to the carbide slug, is quickly brought to its fusion temperature and the immediately adjacent portion of the steel to its plastic deformation temperature. At that instant, the holders or fixtures in which the slug 18 and the tooth are held, are moved toward one another with the path of the slug 18 such that its top is at least as high as the point of the tooth, and with a force sufficient to upset or deform the adjacent portion of the tooth and drive the tungsten carbide slug into the steel tooth. As this is done, the steel of the tooth is upset as at 19, with the greatest volume of upset material at the outer end of the tooth rather than near the inner end of the slug as might be expected.

As the carbide slug is forced against and into the tooth, the slug undergoes a slight change in shape so that when the junction is complete, the interface between the carbide slug and the steel tooth is no longer parallel to the front edge of the tooth, but curved with the slug thicker at its top than at its bottom.

Why the penetration of the carbide slug into the tooth is not uniform, or, in other words, why the slug is deformed despite the fact that the temperature involved does not reach the melting point of the tungsten, is not known. The answer may lie in a combination of factors, such as temperature variation due to varying heat losses from the interface to the band back by conduction or to the atmosphere by radiation; and perhaps a minor dimensional deformation in the end portion of the slug as it is driven into the tooth.

The unusual pattern which the upset material 19 assumes as the weld is formed, likewise is not understood, but may be caused, in part at least, by a magnetic field that exists around the fusion zone, causing the flowing metal to locate itself as shown.

In any event, as the slug of tungsten carbide is pushed into the steel tooth, it forms a socket for itself and, upon completion of the weld, it is set into the leading edge portion of the tooth, as shown, and the contiguous portion of the tooth is upset or swaged outwardly, as shown in FIGURE 5.

The carbide slug 18 is preferably of the same thickness as the tooth, though of course it could be thicker, and would be if a wedge-shaped tooth tip was desired, such as that shown in FIGURE 7.

After the slug 18 has been electric-welded to the tooth in the manner described, the excess portion of the slug is cut off in any suitable manner along the dotted line 20 in FIGURE 5. This produces the front face 11 of the carbide tip which, as noted hereinbefore, and as shown in FIGURE 2, is slightly forward of the leading edge 12 of the tooth to facilitate sharpening.

It has been found that best results are obtained if the maximum thickness of the carbide tip—as measured from its front face to its rear—does not exceed approximately fifteen thousandths of an inch where the width of the tip is on the order of thirty-two thousandths of an inch (.032″) and its length is about forty thousandths of an inch (.040″). Apparently, this locates the line of cut 20 close enough to the fused junction 17 to relieve or sufficiently diminish any internal stresses that may have been set up in the carbide slug during the formation of the fused junction, as a result of the unequal coefficients of expansion of tungsten carbide and steel. Such stresses, if present, would make the junction more susceptible to failure by impact forces acting on the carbide tips.

It is also quite likely that as the fused junction between the tungsten carbide and steel is formed, the steel molecules migrate into the tungsten carbide, which being a cemented and sintered material, is not as dense as the steel.

However, no matter what the real explanation for the exceptional strength of the fused junction may be, it is known that when the carbide tips are secured to the steel teeth in the manner described, and have the defined dimensions and shape, relative to the teeth, a saw band or blade is obtained which far surpasses any heretofore available for metal cutting band saws.

Where the tooth tip is to have its conventional shape, i.e. provided with opposite flat, parallel faces, the ridges 19 resulting from the upsetting of the steel during the welding of the slug 18 to the tooth, are ground off so that the sides of the finished carbide tip will be flush with the sides of the saw tooth; but where the tooth is to have the wedge shape shown in FIGURE 7, the sides of the carbide tip and the ridges 19 will, of course, have to be ground accordingly.

After the carbide slug has been welded to the tooth, and cut off as described, the outer end of the remaining carbide tip is ground off to make it either flush with or to dispose the same at an obtuse angle to the adjacent portion 15 of the trailing edge. This, of course, also sharpens the point, and if the outer end is ground at an angle to the edge portion 15, grinding is facilitated as it obviates the need for having the grinding wheel (usually diamond) contact the steel of the tooth.

Sharpening, and in fact resharpening, also can be effected by grinding the front face of the carbide tip and without in any wise affecting the contour of the saw tooth or having the diamond grinding wheel used for this purpose come into contact with the steel, because of the protrusion of the front face of the carbide tip beyond the front edge of the tooth.

When all the teeth of a band or blade which are to have carbide points have had them affixed thereto, and the teeth have been ground to shape and sharpness, the teeth are set in the customary manner and then the entire band or blade may be given a heat treatment to relax any remaining stresses.

Those skilled in this art will readily understand which of the various available steel alloys would be best suited for the band or body of the saw blade and the tooth, but for completeness of disclosure, the band may be of S.A.E. 6150 alloy steel with a hardness of 40–50 Rc; and the teeth may be formed in the band in any suitable manner, as by a punching operation.

Throughout the foregoing specification, and also in the claim, where the term "carbide" has been used, it is to be understood as being generic for tungsten carbide, with and without additives such as titanium carbide, boron carbide, tantalum carbide, cobalt, and any other similar alloy having extreme hardness and the structure and properties of tungsten carbide. Hence, in construing this specification and the appended claim, the term "carbide" should be given this generic meaning.

Though perhaps needless, it may be well to point out that since tungsten carbide is an expensive material, the slugs 18 should be as small as possible, always providing, however, that they have to be large enough to be grasped in a suitable holder during the welding thereof to the steel teeth. Obviously, by keeping the slugs 18 as small as possible, the amount of carbide wasted when the slugs are cut along the dotted line 20 in FIGURE 5, is reduced to a minimum.

What is claimed as my invention is:

An improved flexible band saw comprising: a band of steel possessing the properties necessary to withstand shock and have good resistance to fatigue failure; teeth integral with the band and spaced along one edge thereof, said teeth having leading and trailing edges at an acute angle to one another; a carbide cutting tip set into the outer leading portion of each tooth, the carbide tip being much smaller than the tooth and having a front face no part of which trails the leading edge of the tooth and an outer end flush with the adjacent portion of the trailing edge of the tooth, the carbide tip extending rearwardly into the tooth and being supported by the tooth at its inner end as well as at its rear; a fused junction between the carbide tip and the steel tooth consisting exclusively of the carbide of the tip and the steel of the tooth in bonded relation to one another along the rear and inner end of the tip; the length of the carbide tip from end to end being about one-third the height of the tooth; the width of the carbide tip being on the order of thirty-two thousandths of an inch; and the thickness of the carbide tip as measured from the front face thereof to the junction at its rear with the tooth, being greater at its outer end than at its inner end, and not exceeding about fifteen thousandths of an inch at its outer end.

References Cited in the file of this patent

UNITED STATES PATENTS

| | | |
|---|---|---|
| 1,025,735 | De Bosredon | May 7, 1912 |
| 2,318,549 | Wilkie | May 4, 1943 |
| 2,714,317 | Drake | Aug. 2, 1955 |
| 2,720,229 | Drake | Oct. 11, 1955 |
| 2,826,941 | Kolesh | Mar. 18, 1958 |

FOREIGN PATENTS

| | | |
|---|---|---|
| 347,173 | Great Britain | Apr. 20, 1931 |
| 741,186 | Great Britain | Nov. 30, 1955 |